Figure 1:
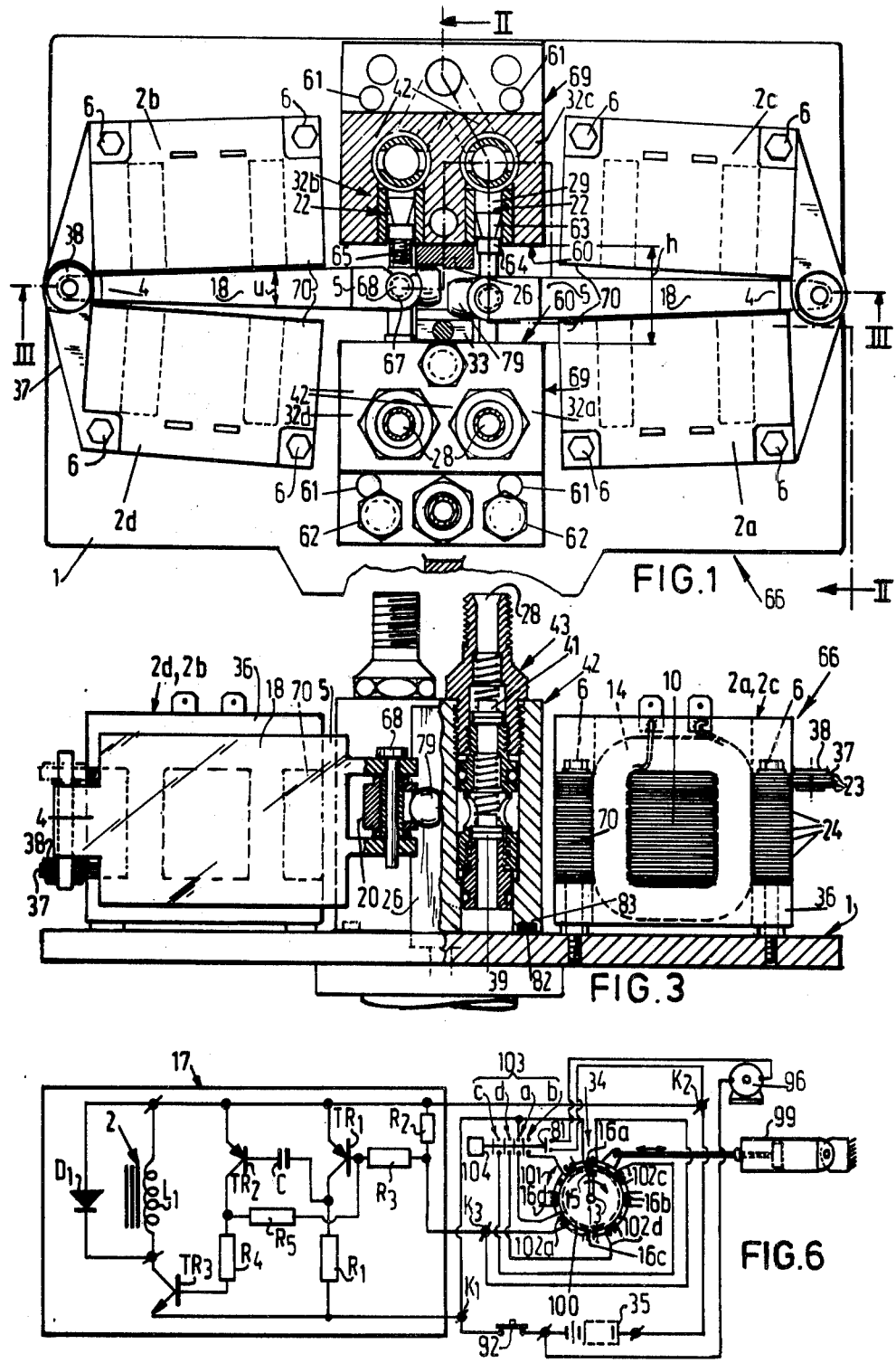

United States Patent [19]

Zeeman

[11] 4,149,505
[45] Apr. 17, 1979

[54] INJECTOR FOR GIVING OFF FUEL TO COMBUSTION ENGINE

[75] Inventor: Jacobus H. Zeeman, Delden, Netherlands

[73] Assignee: Holec, N.V., Hengelo, Netherlands

[21] Appl. No.: 860,961

[22] Filed: Dec. 15, 1977

Related U.S. Application Data

[63] Continuation of Ser. No. 772,443, Feb. 28, 1977, abandoned, which is a continuation of Ser. No. 560,943, Mar. 21, 1975, abandoned.

[30] Foreign Application Priority Data

Mar. 22, 1974 [NL] Netherlands ........................ 7403919

[51] Int. Cl.² ............................................ F02M 39/00
[52] U.S. Cl. ......................... 123/139 E; 123/139 AC; 417/410
[58] Field of Search ........ 123/139 E, 32 AE, 139AC, 123/139 AD, 139 AE, 139 AW; 417/410, 413

[56] References Cited

U.S. PATENT DOCUMENTS

| | | | |
|---|---|---|---|
| 1,534,829 | 4/1925 | Behnke | 123/139 E |
| 1,771,907 | 7/1930 | Abramson | 123/139 AC |
| 1,925,934 | 9/1933 | Rimstad | 417/410 |
| 2,950,706 | 8/1960 | Senckel | 123/32 |

FOREIGN PATENT DOCUMENTS

397493  8/1933  United Kingdom ................ 123/139 E

*Primary Examiner*—Ronald B. Cox
*Attorney, Agent, or Firm*—John P. Snyder

[57] ABSTRACT

An injector for giving off fuel to at least one fuel inlet of a combustion engine, in which the pump chamber of at least one fuel pump has a displacer volume adjustable by control-means, in that a displacer body is coupled with a stop member consisting of a hardened roller element, said roller element being able to be produced as ball, barrel or cylinder, at a low cost, in accurate dimensions and with a high degree of hardness.

22 Claims, 8 Drawing Figures

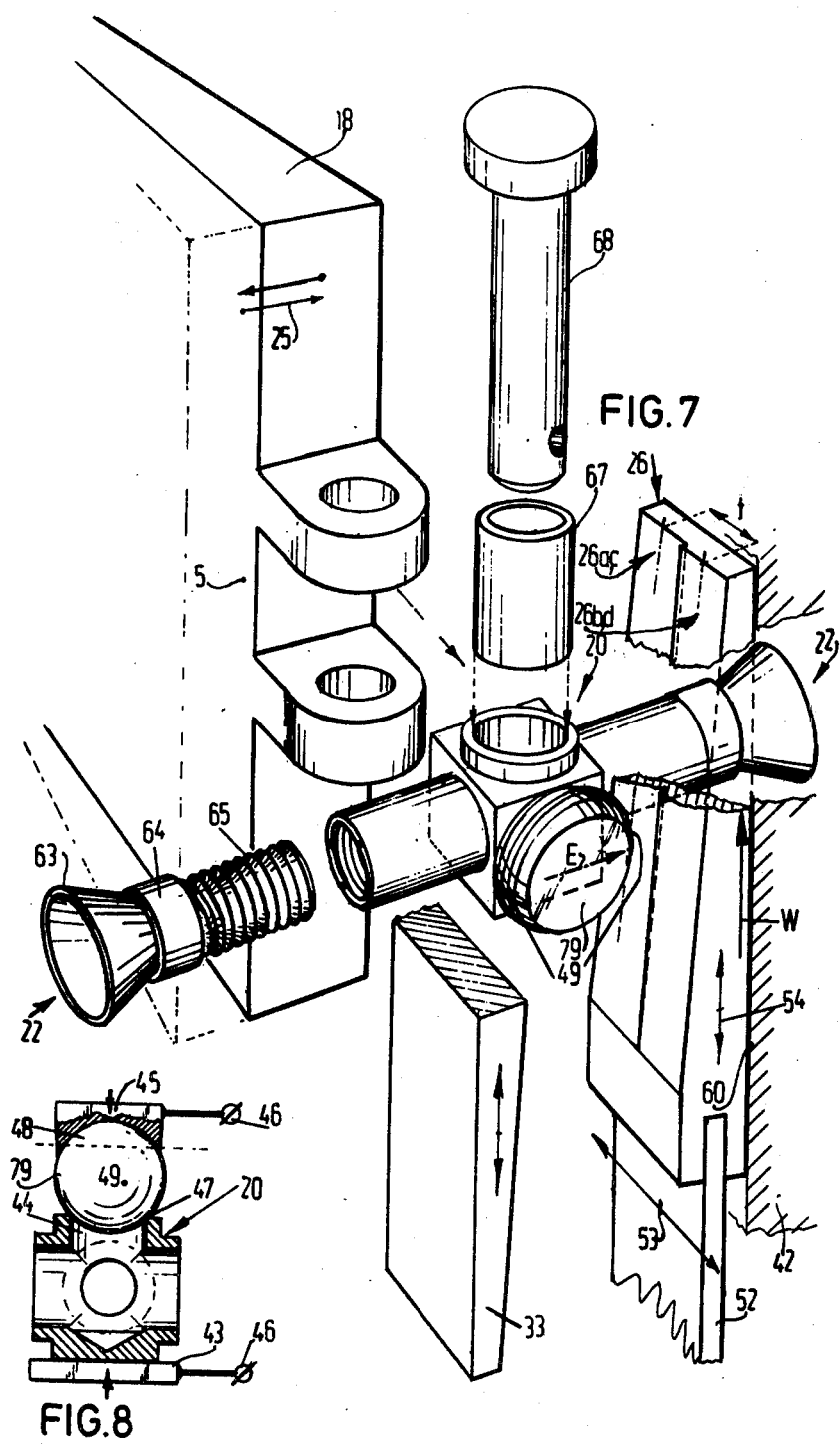

INJECTOR FOR GIVING OFF FUEL TO COMBUSTION ENGINE

This is a continuation, of application Ser. No. 772,443 of Feb. 28, 1977 now abandoned which is rule 60 cont. of Ser. No. 560,943 of March 21, 1975, now abandoned.

The invention relates to an injector for giving off fuel to at least one fuel inlet of a combustion engine, in which the pump chamber of at least one fuel pump has a displacer volume adjustable by control-means, said chamber communicating via an inlet valve with a fuel supply and via an outlet valve with a fuel outlet to be connected with the fuel inlet of the combustion engine and being bounded by at least one displacer body, which is coupled with at least one stop member abutting by a convex stop surface against at least one stop which is displaceable by the control-means.

Such an injector is known.

The formation of a convex stop surface on the stop member has to be true to measure in order to ensure an accurate adjustment of the displacer volume of the pump, which is a difficult operation.

The invention has for its object to obtain the required accuracy of dimensions of the stop member in a simple manner. For this purpose the stop member of the injector embodying the invention is formed by at least part of a hardened roller element. The accuracy in dimension and the required surface hardness are provided by a separate part, that is to say, a roller element, which is for example cylindrical or barrel-shaped and which preferably consists of a ball, while it can be produced in a simpler manner in large quantities at low cost in accurate dimensions and with a high degree of hardness. The length of stroke is independent of a tilted position of a stop member formed by a round roller element.

The roller element is preferably welded or soldered to a coupling member connected with the displacer body.

Further features of the invention will be set out hereinafter with reference to a drawing.

Figure 2:
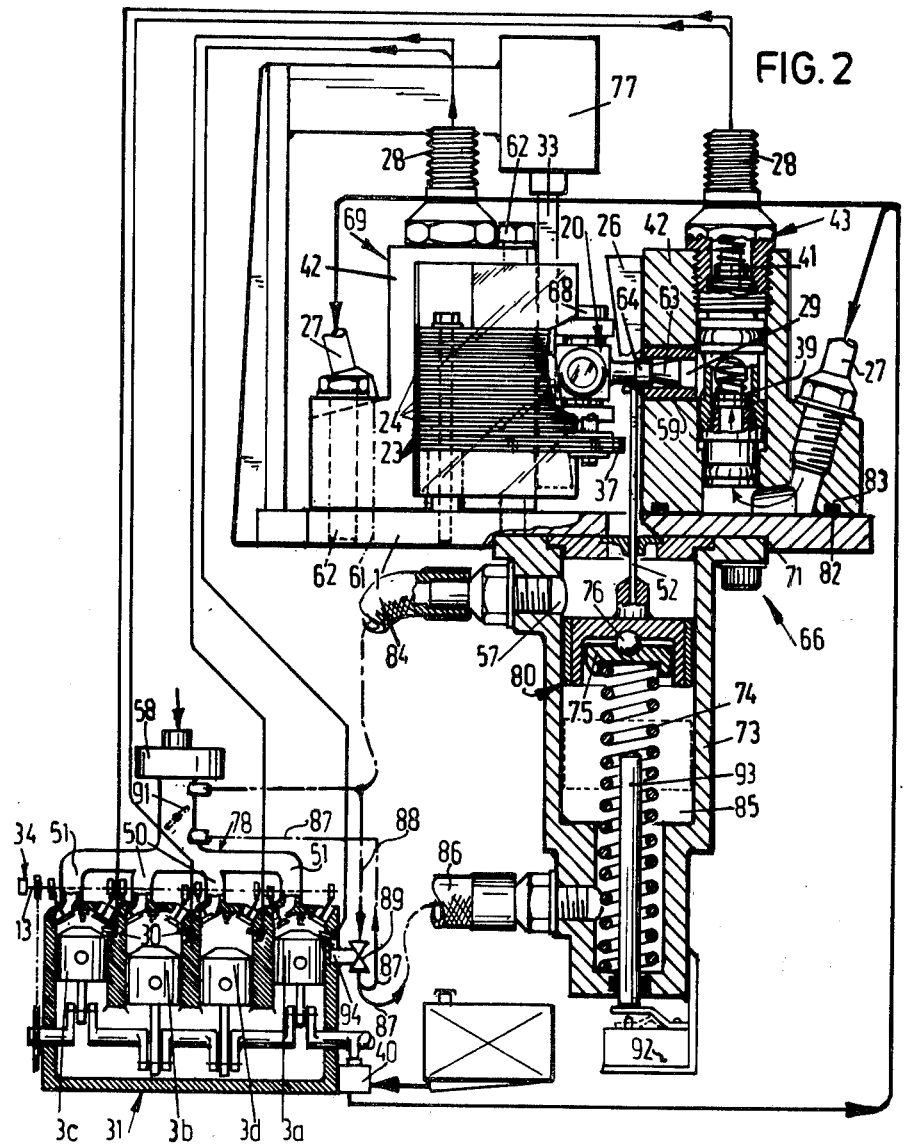
Figure 5:
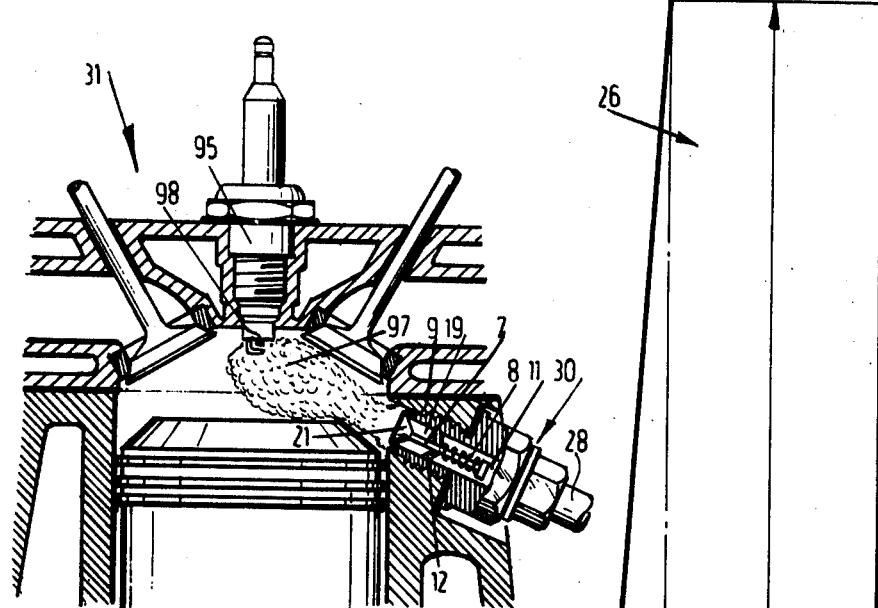
Figure 4:
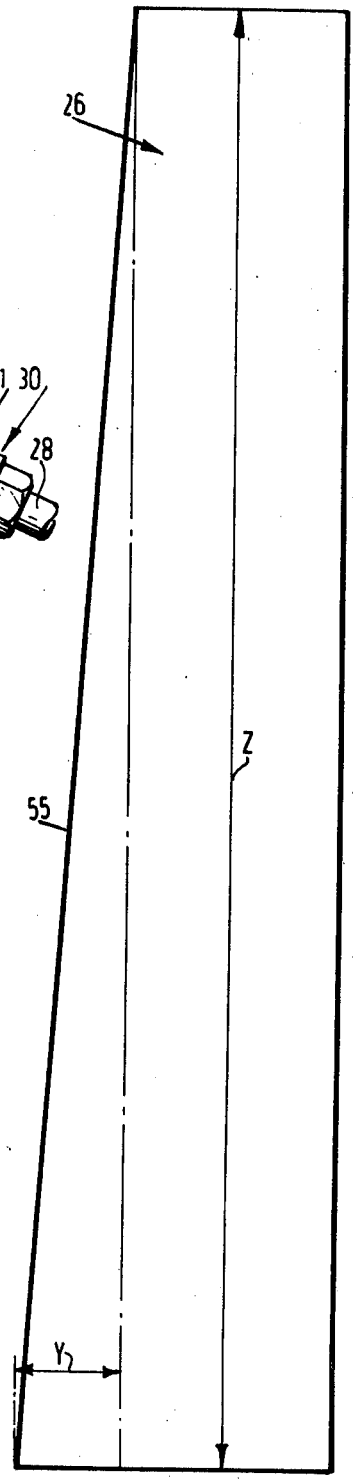

In the drawing:

FIG. 1 is a plan view partly broken away of a preferred embodiment of an injector according to the invention, FIG. 2 is a sectional view taken on the line II—II in FIG. 1, showing schematically the connection with a combustion engine, FIG. 3 is a sectional view taken on the line III—III in FIG. 1, FIG. 4 shows a key on an enlarged scale, FIG. 5 is an enlarged sectional view of part of a combustion cylinder, FIG. 6 is a diagram of an electronic circuitry for the energization of electro-magnets, FIG. 7 is an enlarged, perspective view of the parts co-operating with the coupling member, and FIG. 8 illustrates a coupling member in course of manufacture.

Two pairs of electro-magnets 2a and 2c, 2b and 2d respectively are rigidly secured by means of bolts 6 to a mounting plate 1, forming the frame of the injector 66. Each of the electro-magnets 2a, 2b, 2c and 2d comprises a core 10 formed by a stack of magnet plates 23 and 24 and an energizing coil 14 surrounding said core 10. The bolts 6 engage the magnet plates 23 and 24. Each electro-magnet 2a, 2b, 2c and 2d is embedded in a block of synthetic resin 36. A sheet-like armature 18 is pivotally arranged between each pair of alternately energized electromagnets 2a, 2c and 2b, 2d respectively. Each armature 18 is pivoted by one end 4 to projecting ears 37 of magnet plates 23 of each of a pair of electro-magnets 2a, 2c and 2b, 2d respectively. At its free end 5 each armature 18 holds a coupling member 20, with which are connected two displacer bodies 22 of two fuel pumps 32a, 32c and 32b, 32d respectively. The stroke of the displacer bodies 22 is determined by adjustable control-means arranged on each side of the coupling members 20 and formed by two wedges 26 and 33.

Each fuel pump 32a, 32b, 32c and 32d comprises a pump housing 42 having a pump chamber 29 bounded by an inlet valve 39 and an outlet valve 41, a fuel inlet 27 to be connected with a fuel supply pump 40 and a plurality of fuel outlet ducts 28, each of which leads to an atomizer 30 of a combustion engine 31. The pump housings 42 are arranged pairwise coaxially opposite one another and at a distance h from one another by means of connecting means. These connecting means are formed by fitting pins 61 and bolts 62, which rigidly secure the pump housings 42 to the base plate 1. The bottom sides of the pump housings 42 have annular grooves 83 accommodating rubber O-rings 82 for sealing the pump housings 42 against the base plate 1. The front surfaces 60 of the pump housings 42 are held in accurate parallel positions to one another by the fitting pins 61.

The displacer bodies 22 are each made of a synthetic resin, preferably a superpolyamide and comprise each a cup-shaped piston 63, a guide collar 64 engaging the pump chamber 29 and a screw piece 65, which is screwed into a hard steel coupling member 20 with the interposition of glue.

The displacer bodies 22 of each pair of fuel pumps 32a, 32c, and 32b, 32d respectively are coupled with one another by means of a coupling member 20. Each coupling member 20 is coupled with an armature 18 by means of an elastic ring 67 gripping around a pin 68 of the armature 18.

The displacer volume of each fuel pump 32a, 32c and 32b, 32d respectively is determined by the stroke of a coupling member 20, which is adapted to reciprocate by convex stop surfaces 49 of a stop member 79 between the wedges 26 and 33. In order to maintain the accurate adjustment of said stroke the stop member 79 as well as the wedges 26 and 33 are made of hard steel, whilst said wedges bear on hard steel cylinders 59 pressed into the pump housing 42. At each stroke the coupling member 20 abuts against a hard stop, whereas the mass of the armature 18 moves on over a small distance and is resiliently stoped by the ring 67.

The stop member 79 is formed by a hard steel ball, which after being hardened and accurately made to measure with a given diameter is welded to the coupling member 20. For this purpose, as is shown in FIG. 8, the coupling member 20 is put down on a flat electrode 43 and said ball is pressed by means of a concave electrode 45 into a previously made bore 44 of the coupling member 20, whilst the required, transient electric voltage from a known welding set is applied to the terminals 46 is order to melt the edge 47 of the bore 44 and thus fuse the ball to the coupling member 20. Instead of being welded, the ball could be soldered. After the connection with the coupling member 20 a cap 48 may, if desired, be ground off the ball.

Since the stop surfaces 49 of the stop member 79 are accurately spherical, the yield of the associated fuel pumps 32a, 32c or 32b, 32d is independent of a tilting movement of the coupling member 20.

Two housing blocks 69 are each formed by two contiguous pump housings 42, between which wedge 26 and 33 are disposed to serve as common control-means for each of the fuel pumps 32a, 32c and 32b, 32d. The distance t between the coupling members 20 is small so that fluctuations of the pump yield due to mounting errors are small.

Each atomizer 30 comprises a needle 7, a conical end 21 of which is tightly drawn by a strong spring 8 to the seat 9. At a high pressure of fuel in a chamber 11 communicating with the fuel duct 28 and a chamber 19 communicting with the former through a perforated collar 12 said end 21 is urged away from the seat 9 against the action of the spring 8 (see FIG. 5).

Each electro-magnet 2a, 2b, 2c and 2d is controlled by a circuitry 17 shown schematically in FIG. 6. The transistors $TR_1$ and $TR_2$ in conjunction with the associated resistors $R_1$, $R_2$, $R_3$, $R_4$ and $R_5$ and the capacitor C constitute a monostable multivibrator. The resistor $R_1$ and the capacitor C determine the time constant. The collector output of the transistor $TR_2$ forms via the resistor $R_4$ the input of the transistor $TR_3$, which serves as an amplifier for the current to be passed through the coil $L_1$ of the electro-magnet 2a, 2b, 2c or 2d. Across the coil $L_1$ is connected a quenching diode $D_1$. To the input terminals $K_1$ $K_2$ is connected a supply source 35 and the input $K_3$ serves for the application of a control-pulse originating from a pulse generator 34. The pulse generator 34 may be coupled, for example, with a cam shaft 13 of the combustion engine 31 and comprises a rotatable permanent magnet 15, which passes alternately by one of the four coils 16a, 16b, 16c and 16d for sequentially energizing the electro-magnets 2a, 2b, 2c and 2d respectively. Each of said four coils 16a, 16b, 16c and 16d is disposed between the input terminals $K_3$ and $K_1$ of an associated circuitry 17. In this way an atomizer 30 injects the fuel required for each combustion cylinder during each cycle of the combustion engine 31 at the required instant. The order of succession of energization of the electro-magnets 2a, 2b, 2c and 2d is chosen so that each of the wedges 26 and 33 is just released from a coupling member 20 in each cycle so that each of them can be adjusted individually by a slight adjusting force.

The combustion engine 31 comprises for combustion cylinders 3a, 3b, 3c and 3d. Ignition of the combustion cylinders 3a, 3b, 3c and 3d is performed in said order. The pumps 32a, 32b, 32c and 32d are associated with the combustion cylinders 3a, 3b, 3c and 3d respectively. Immediately after the reversal of the air stream in the inlet manifold 72, a combustion cylinder 3b or 3d has each time to be filled so that the air volume in the combustion cylinders 3b and 3d is frequently slightly smaller than that of the combustion cylinders 3a, and 3c. Therefore, the stroke of the displacer bodies 22b and 22d is made slightly smaller than that of the displacer bodies 22a and 22c, for example, by providing a slight discrepancy in the diameters of the associated balls or by providing a steeper slope for the halves 26a,c of the wedge 26 than that of the halves 26b,d which is shown on an exaggerated scale in FIG. 7. Since the pumps 32a and 32c for feeding the two outermost combustion cylinders 3a and 3c have a common coupling member 20, the adjusted quantity of fuel for this set of combustion cylinders is identical. Likewise, the fuel supplies to the combustion cylinders 3b and 3d are identical.

FIG. 2 illustrates the drive of the wedge 26 by a piston 80 of a cylinder 73. A measuring chamber 85 of the cylinder 73 communicates constantly via ducts 86 and 87 with the air inlet manifold 72 of the combustion engine 31 connected via a throttle valve 91 with an air filter 58. The piston 80 is coated with a layer of polytetrafluoroethene in order to reduce frictional resistance between the piston 80 and the cylinder 73.

A reset spring 74 centrally engages the piston 80 through a cup spring 75 annd a ball 76. In this way the frictional resistance due to setting of the piston 80 is prevented from delaying the adjustment of the wedge 26. The other wedge 33 is displaced, independently of the wedge 26, under the action of other factors, for example, atmospheric pressure by means of a control-member 77. The piston 80 is coupled by means of a leaf spring 52 with the wedge 26. The leaf spring 52 is slack in the directions of movement 25 of the displacer bodies 22, but in the directions of displacement 54 and in directions at right angles thereto 52 it is rigid. The leaf spring 52 constitutes a resilient means urging the wedge 26 by slight force against a supporting surface formed by the front face 60 of the pump housings 42. At each shock of the stop surface 49 against the wedge 26 a frictional force W is produced between the wedge 26 and the front face 60 in order to prevent the impact force E from displacing the wedge 26 in the direction 54. This frictional force is sufficient because the slope of the control-surface 55 is 1:14, which is less than the slope of 1:10 required for self-braking. The slope 1:14 is preferred, because with a variation in stroke Y of, for example, 1.7 mms a shift path Z of the wedge of, for example, 22 mms is then obtained, which permits of accurately adjusting the wedge 26. The control-surface 55 preferably has a completely constant slope (see FIG. 4).

The cylinder 73 has fastened to it an electric switch 92, which is actuated by way of a bar 93 by the cup spring 75 of the piston 80, when the pressure in the inlet manifold 72 drops below a given pressure of, for example, 200 mms Hg absolute value. The tension of the spring 74 and the switching position of the piston 80, shown by broken lines in FIG. 2, are chosen accordingly. Said given pressure is comprised between the values of about 250 and 150 mms Hg produced in the inlet manifold 72 in an idle run (stationary run). In the switching position of the piston 80 the wedge 26 is in the minimum state, in which the pumps 32a, 32b, 32c and 32d yield the minimum quantity of fuel required for perfect combustion. Upon deceleration the pressure in the inlet manifold 72 drops below said given value. Then the quantity of air entering the combustion cylinders 3a, 3b, 3c and 3d is too small for ensuring perfect combustion. As soon as after deceleration a sufficient quantity of air is available in the inlet manifold 72 for ensuring satisfactory combustion, the required minimum quantity is given off. In this situation the combustion engine 31 supplies only little power and thus gradually gains in force, which is to be preferred over an abrupt start. The swich 92 is connected between the accumulator 35 and the terminal $K_1$ so that, when the switch 92 is open, no control-pulses are supplied.

The overall mass $m_1$ of the piston 80 and the parts coupled herewith, for example, the ball 76, dish 75, leaf spring 52 and the wedge 26 is comparatively large, for example, 100 gs, this value being chosen such that the frequency proper $w_1$ of the mass spring system of this overall mass $m_1$ and the spring 74, whose stiffness $c_1$ is, for example, 2500 gs/cm is appreciably lower than the frequency $w_2$ of the pressuure fluctuations in the inlet manifold 72 at a low speed n of 800 rev/min due to the suction of air by the combustion cylinders 3a, 3b, 3c and 3d. With a 4-cylinder 4-cycle engine 31 $w_1$ of the injector embodying the invention is $\sqrt{c_1/m_1}$, which is materially lower than $800 \times 4 \times \frac{1}{2}$.

The leaf spring 52 is passed through a slot 56 of the cylinder 73 in a seal of tetrafluoroethene. The cylinder 73 has, above the piston 80, a vent port 57, which communicates through a duct 84 with the air filter 58, through which the air of the combustion engine 31 is sucked in. In this way soiling of the cylinder 73 is avoided. The cylinder 73 is accurately centered to the pump housings 42 and fastened to the base plate 1 by means of an annular recess 71 in the base plate 1.

An air inlet 88, which communicates through a closing member 89 with the duct 84 of the air filter 58, is on the one hand in communication through the duct 86 with the measuring chamber 85 and on the other hand through the duct 87 with the inlet manifold 72. The closing member 89 is controlled by a thermostat 90 arranged at a place 94 of the combustion engine 31 and adapted to open the closing member 89 at a drop of the engine temperature below a prefixed value and closing the same above said value. During the warming-up period of the combustion engine 31 the duct 86 passes air from the inlet 88 to the measuring chamber 85, the manifold 72 being short-circuited, whilst additional air passes from the air filter 58 beyond the throttle valve 91 through the inlet 88 and the duct 87 into the inlet manifold 72. The pressure prevailing in the measuring chamber 85 is then considerably higher than the pressure in the inlet manifold 72 so that the wedge 26 in set in a position in which appreciably more fuel is given off than is required for the stoichiometric proportion associated with the degree of air filling in the combustion cylinders 3a, 3b, 3c and 3d. When the closing member 89 is opened, the combustion cylinders 3a, 3b, 3c and 3d are filled with a larger quantity of air, whilst the mixture is particularly rich.

The place 94 on the combustion engine 31 may be chosen arbitrarily because the ducts 86 and 87 are formed by air hoses.

As is illustrated in FIG. 5 each atomizer 30 injects directly into a cylinder 3a, 3b, 3c or 3d and preferably in such a direction and at such an instant of the engine cycle that at the instant of ignition the spark gap 98 of a spark plug 95 is surrounded by a cloud 97 of finely atomized fuel, whereas at an area remote from the spark gap 98 the mixture has a poor fuel content. This heterogenuous distribution of fuel in the combustion cylinder is highly conductive to the ignition. Owing to the use of the electro-magnetic drive of the displacer body 22 the fuel can be finely atomized at a pressure of 20 to 30 ato, about 10 ato, for example, serving to overcome the compression pressure and the remainder for carrying out the fine atomization. The force exerted on the armature 18 by an electro-magnet 2a, 2b, 2c or 2d strongly increases according as the armature 18 further approaches this energized magnet. Thus the armature 18 and hence the displacer body 22 of the fuel pump 32a, 32b, 32c or 32d respectively is accelerated even at the end of the pump stroke so that even with an opened atomizer 30 the fuel to be atomized maintains a great pressure difference across the atomizer opening, which ensures a fine atomization. Therefore, an atomizing pressure of 20 ato at a compression pressure of 12 ato is amply sufficient. The magnetic force exerted on the armature 18 can be enhanced by avoiding oversaturation of the iron of the armature 18 at the magnet poles 70 located near a coupling member 20. For this purpose an armature 18 is chosen whose thickness u gradually increases from the end 4 up to the free end 5.

By using the electro-magnetic drive the instant of injection can be readily changed for matching the conditions varying in the course of operation or for matching a particular combustion engine 31. With a view to an optimum composition of the exhaust gases, for example, without CO, the instant of injection can be from 150° to 10° before TDC dependent upon the number of revolutions n and/or the temperature of the combustion engine 31 and/or dependent upon the torque supplied by the combustion engine 31. An advantageous result was obtained, for example, with an injection of 30° before TDC at an ignition of 10° before TDC.

The identical change of the injection with respect to the instant of sparking of all combustion cylinders 3a, 3b, 3c and 3d is carried out by means of a speed-, torque- and/or temperature-sensitive regulator 99, which shifts an annular support 100 of the coils 16a, 16b, 16c and 16d in the direction of the arrows 101 (see FIG. 6).

The support 100 holds, in addition, a set of coils 102a, 102b, 102c and 102d connected by contacts 103a, 103b, 103c and 103d respectively of a switch 103 between the inputs $K_1$ and $K_3$. The switch 103 is switched on at a low number of revolutions of the combustion engine 31 by a control-member 104, which may be the starting knob of the combustion engine 31 and which actuates simultaneously a switch 81 for switching on the electric starting motor 96. In this way during the start every electro-magnet 2 is energized twice and afterwards only once per engine cycle. During the start twice the maximum yield of each fuel pump 32a, 32b, 32c and 32d is provided.

What I claim is:

1. In a fuel injection pump including a pair of electromagnets disposed in spaced relation, means for alternately energizing said electromagnets, an elongate armature pivoted at one end and extending therefrom between said electromagnets to terminate in a free end beyond said electromagnets, a coupling member pivotally attached to the free end of said armature about an axis parallel to the pivot axis of said armature, a fuel-displacing member attached to said coupling member, a stop member fixed to said coupling member and projecting therefrom in a direction away from said armature, a pair of stop elements disposed in spaced relation to each other in the path of movement of said stop member with the spacing between said stop elements being such that said armature is free to flap back and forth without engaging said electromagnets, and at least one of said stop elements being movable to alter the length of the path traversed by said stop member between said stop elements and thereby vary the stroke of said coupling member, the improvement wherein:

said stop member is formed of a hardened element such as the ball of a ball bearing separate from but attached to said coupling member and presenting a surface of revolution whose axis extends in the direction of the armature.

2. In a fuel injection pump as defined in claim 1 wherein said coupling member is cruciform.

3. In a fuel injection pump as defined in claim 2 wherein said stop member is a ball.

4. In a fuel injection pump as defined in claim 3 wherein said stop member presents a hollow arm within which said ball is seated.

5. In a fuel injection pump as defined in claim 1 wherein said movable stop element is in the form of a wedge.

6. In a fuel injection pump as defined in claim 5 wherein said coupling member is cruciform.

7. In a fuel injection pump as defined in claim 6 wherein said stop member is a ball.

8. In a fuel injection pump as defined in claim 7 wherein said stop member presents a hollow arm within which said ball is seated.

9. In a fuel injection pump as defined in claim 1 including a pair of pump bodies disposed in spaced relation to each other and each having a bore therein, said fuel-displacing member comprising a piston reciprocable in one bore and there being a second piston attached to said coupling member reciprocable in the other bore, each stop element engaging a respective pump body.

10. In a fuel injection pump as defined in claim 9 wherein said coupling member is cruciform.

11. In a fuel injection pump as defined in claim 10 wherein said stop member is a ball.

12. In a fuel injection pump as defined in claim 11 wherein said stop member presents a hollow arm within which said ball is seated.

13. In a fuel injection pump as defined in claim 12 wherein said movable stop element is in the form of a wedge.

14. In a fuel injection pump as defined in claim 9 wherein said movable stop element is in the form of a wedge.

15. In a fuel injection pump as defined in claim 9 wherein each pump body includes a pair of bores, a second pair of electromagnets disposed in spaced relation to each other on that side of said pump bodies opposite that on which the first mentioned electromagnets are disposed, a second armature pivoted at one end and extending between said second pair of electromagnets, a second coupling member pivotally attached to the free end of said second armature, said pump bodies persenting a second pair of bores and a second pair of pistons attached to said second coupling member and received in said second pair of bores, and a second stop member attached to said second coupling member, said stop elements constituting common stop elements for both of said stop members.

16. A fuel injection pump having a body provided with a pump chamber, said chamber a fuel inlet and a fuel outlet, an inlet valve associated with said fuel inlet and an outlet valve associated with said fuel outlet, a fuel displacer body associated with said chamber, drive means connected with said displacer body for moving same back and forth along a given path to induct fuel into said chamber through said inlet and discharge fuel therefrom through said outlet, and stop means for controlling the stroke imparted by said drive means;

said stop means comprising a pair of rigid stop members presenting opposed and essentially flat surfaces spaced apart in the direction of and adjacent to said given path, and a stop element fixed to said displacer body and extending therefrom to engage said surfaces during the back and forth movements of said displacer body, said stop element consisting of a hardened bearing element presenting a convex surface of revolution whose axis extends normal to said given path whereby to localize the area of contact between each such stop member surface and said bearing element, and at least one of said stop members being movable to alter the spacing between said surfaces and thereby vary the stroke of said displacer body.

17. An injector as claimed in claim 16, wherein said roller element is secured to a coupling member connected with the displacer body.

18. An injector as claimed in claim 16, wherein said roller element is secured in a bore of the coupling member connected with the displacer body.

19. An injector as claimed in claim 16, wherein said roller element is a ball.

20. An injector as claimed in claim 16, wherein said roller element is arranged between two stops limiting the stroke of the displacer body.

21. An injector as claimed in claim 16, wherein the displacer body is coupled with at least one armature of an electro-magnet.

22. An injector as claimed in claim 16, wherein the adjustable stop is a wedge.

* * * * *